(12) United States Patent
Atarius

(10) Patent No.: US 9,125,031 B2
(45) Date of Patent: Sep. 1, 2015

(54) METHODS AND APPARATUS FOR USING USSD OVER A COMMON CHANNEL

(71) Applicant: QUALCOMM Incorporated, San Diego, CA (US)

(72) Inventor: Roozbeh Atarius, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 249 days.

(21) Appl. No.: 13/772,695

(22) Filed: Feb. 21, 2013

(65) Prior Publication Data

US 2014/0106794 A1    Apr. 17, 2014

Related U.S. Application Data

(60) Provisional application No. 61/712,574, filed on Oct. 11, 2012.

(51) Int. Cl.
H04W 4/00    (2009.01)
H04W 4/14    (2009.01)

(52) U.S. Cl.
CPC ....................... *H04W 4/14* (2013.01)

(58) Field of Classification Search
CPC ............... H04M 1/72547; H04M 3/42382; H04M 7/0048; H04M 7/0051; H04M 15/57; H04M 15/63; H04M 15/844; H04M 17/206; H04M 2017/241; H04M 2017/346; H04M 2203/651; H04M 17/207; H04M 2017/246; H04W 4/12; H04W 4/18; H04W 88/184; H04W 4/14; H04W 4/16; H04W 4/20; H04L 12/58; H04L 12/5825; H04L 12/587; H04L 12/5885; H04L 67/147
USPC ............. 455/403, 412.1–412.2, 414.1–414.4, 455/415, 418–420, 434, 439, 466, 550.1, 455/556.2, 560–561; 370/312, 349, 389, 370/395.5–395.52, 400–401, 410, 432
See application file for complete search history.

(56) References Cited

U.S. PATENT DOCUMENTS 6,233,445 B1 * 5/2001 Boltz et al. ................. 455/404.2
2005/0202836 A1 * 9/2005 Schaedler et al. ............ 455/466
(Continued)

FOREIGN PATENT DOCUMENTS

WO    WO-2010131989 A1    11/2010
WO    WO-2012072958 A1    6/2012

OTHER PUBLICATIONS

Taiwan Search Report—TW102136583—TIPO—Apr. 21, 2015.
(Continued)

*Primary Examiner* — Meless Zewdu
(74) *Attorney, Agent, or Firm* — QUALCOMM IP Department; James Hunt Yancey, Jr.

(57) ABSTRACT

A method, an apparatus, and a computer program product for wireless communication are provided. Embodiments can enhance and improve USSD based messaging options. In an example, a USSD GW is equipped to determine that an USSD based message is able to be communicated using a common channel, and send the USSD based message as part of a USSD session to a MSC with a service indicator prompting the MSC to communicate an informational element of the message to a MS using the common channel. In another example, a MSC is equipped to receive an USSD based message that includes a service indicator prompting the MSC to communicate an informational element to a MS using a common channel. Other aspects, embodiments, and features are also claimed and described.

54 Claims, 13 Drawing Sheets

(56) References Cited

U.S. PATENT DOCUMENTS

| | | | | |
|---|---|---|---|---|
| 2006/0111134 | A1* | 5/2006 | Mills | 455/518 |
| 2006/0114882 | A1* | 6/2006 | Mills | 370/352 |
| 2008/0090586 | A1* | 4/2008 | Engelhart | 455/456.1 |
| 2011/0182220 | A1* | 7/2011 | Black et al. | 370/311 |
| 2011/0317673 | A1 | 12/2011 | Shelby | |
| 2012/0243472 | A1* | 9/2012 | Bienn et al. | 370/328 |
| 2012/0311051 | A1* | 12/2012 | Banks et al. | 709/206 |
| 2013/0021957 | A1* | 1/2013 | Fang et al. | 370/311 |

OTHER PUBLICATIONS

3GPP2 TSG-A, SF-13-xxxr0-RnF-QC-Features USSD support, 2012, 8 pages.

3GPP2 TSG-X WG3, "Flow Diagram for USSD on Common Channel—Network Initiated," 3GPP2 3rd Generation Partnership Project 2, X30-20120806, 2012, 5 Pages.

Sanganagouda J., "USSD: A Communication Technology to Potentially Ouster SMS Dependency," Aricent, Sep. 2011, pp. 1-12.

Anonymous: "USSD Services for Interactive Mobile Users—Building User-Friendly Mobile Telephony Applications Using Dialogic TM Distributed Signaling Interface Components", Internet Citation, Aug. 31, 2008, pp. 1-17, XP002528245, Retrieved from the Internet: URL:http://www.dialogic.com/products/docs/appnotes/11038_USSD_an.pdf [retrieved on May 11, 2008] the whole document.

International Search Report and Written Opinion—PCT/US2013/063283—ISA/EPO—Jan. 8, 2014.

* cited by examiner

METHODS AND APPARATUS FOR USING USSD OVER A COMMON CHANNEL

PRIORITY CLAIM

The present Application for Patent claims priority to Provisional Application No. 61/712,574 entitled "METHODS AND APPARATUS FOR USING USSD OVER A COMMON CHANNEL" filed Oct. 11, 2012, and assigned to the assignee hereof and hereby expressly incorporated by reference herein.

TECHNICAL FIELD

The technology discussed in this present disclosure relates generally to communication systems, and more particularly, to improving Unstructured Supplementary Service Data (USSD) based messaging options. Certain embodiments provide and enable improved USSD based messaging options, including scenarios where a message is of a relatively smaller size.

BACKGROUND

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division—Code Division Multiple Access (TD-CDMA), and Time Division—Synchronous Code Division Multiple Access (TD-SCDMA). The UMTS also supports enhanced 3G data communications protocols, such as High Speed Packet Access (HSPA), which provides higher data transfer speeds and capacity to associated UMTS networks.

Another form of communications used in a 3GPP based access network is Unstructured Supplementary Service Data (USSD) based messaging. USSD was originally developed for GSM. USSD based messaging allows a Mobile Station (MS) user and a network entity (e.g., a public land mobile network (PLMN)) application to communicate in a way which is transparent to the MS and to intermediate network entities. For example, Machine to Machine (M2M) triggering in cdma2000 can be done by use of USSD. The USSD in CDMA2000 is currently supported via use of a traffic channel only, and cannot be communicated using a common (e.g., paging) channel. Similar to Short Message Services (SMS), the USSD uses a type of Data Burst Message (DBM). Switching between traffic channel and the common channel is based on the size of the payload for SMS. Such a process is not currently possible for USSD. As such, even when a small message (e.g., M2M triggering) is being sent using USSD, a traffic channel connection must be used.

BRIEF SUMMARY OF SOME SAMPLE EMBODIMENTS

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In accordance with one or more aspects and corresponding disclosure thereof, various aspects are described in connection with improving USSD based messaging options. In one example, a USSD gateway (USSD GW) is equipped to determine that an USSD based message is able to be communicated using a common channel, and send the USSD based message as part of a USSD session to a mobile switching center (MSC) with a service indicator prompting the MSC to communicate an informational element of the message to a mobile station (MS) using the common channel. In another example, a MSC is equipped to receive an USSD based message that includes a service indicator prompting the MSC to communicate an informational element to a MS using a common channel, determine that the informational element is to be communicated using the common channel, and send the informational element to a base station to be transmitted to the MS using the common channel. In still another example, a MS is equipped to receive an USSD based message with an informational element using a common channel, process the informational element, and transmit an acknowledgement indicating that the informational element was successfully processed.

According to a related aspect, a method for improving USSD based messaging options is provided. The method can include determining that an USSD based message is able to be communicated using a common channel. Moreover, the method may include sending, by a USSD GW, the USSD based message as part of a USSD session to a MSC with a service indicator prompting the MSC to communicate an informational element of the message to a MS using the common channel.

Another aspect relates to a communications apparatus enabled to improve USSD based messaging options. The communications apparatus can include means for determining that an USSD based message is able to be communicated using a common channel. Moreover, the communications apparatus can include means for sending, by a USSD GW, the USSD based message as part of a USSD session to a MSC with a service indicator prompting the MSC to communicate an informational element of the message to a MS using the common channel.

Another aspect relates to a communications apparatus. The apparatus can include a processing system configured to determine that an USSD based message is able to be communicated using a common channel. Moreover, the processing system may further be configured to send, by a USSD GW, the USSD based message as part of a USSD session to a MSC with a service indicator prompting the MSC to communicate an informational element of the message to a MS using the common channel.

Still another aspect relates to a computer program product, which can have a computer-readable medium including code for determining that an USSD based message is able to be communicated using a common channel. Moreover, the computer-readable medium can include code for sending, by a USSD GW, the USSD based message as part of a USSD session to a MSC with a service indicator prompting the MSC to communicate an informational element of the message to a MS using the common channel.

According to related aspects, a method for improving USSD based messaging options is provided. The method can include receiving, by a MSC, an USSD based message from a USSD GW that includes a service indicator prompting the MSC to communicate an informational element to a MS using a common channel. Further, the method can include determining that the informational element is to be communicated to the MS using the common channel. Moreover, the method may include sending the informational element to a base station to be transmitted to the MS using the common channel.

Another aspect relates to a communications apparatus enabled to improve USSD based messaging options. The communications apparatus can include means for receiving, by a MSC, an USSD based message from a USSD GW that includes a service indicator prompting the MSC to communicate an informational element to a MS using a common channel. Further, the communications apparatus can include means for determining that the informational element is to be communicated to the MS using the common channel. Moreover, the communications apparatus can include means for sending the informational element to a base station to be transmitted to the MS using the common channel.

Another aspect relates to a communications apparatus. The apparatus can include a processing system configured to receive, by a MSC, an USSD based message from a USSD GW that includes a service indicator prompting the MSC to communicate an informational element to a MS using a common channel. Further, the processing system may be configured to determine that the informational element is to be communicated to the MS using the common channel. Moreover, the processing system may further be configured to send the informational element to a base station to be transmitted to the MS using the common channel.

Still another aspect relates to a computer program product, which can have a computer-readable medium including code for receiving, by a MSC, an USSD based message from a USSD GW that includes a service indicator prompting the MSC to communicate an informational element to a MS using a common channel. Further, the computer-readable medium may include code for determining that the informational element is to be communicated to the MS using the common channel. Moreover, the computer-readable medium can include code for sending the informational element to a base station to be transmitted to the MS using the common channel.

According to related aspects, a method for improving USSD based messaging options is provided. The method can include receiving, by a MS, an USSD based message with an informational element using a common channel. Further, the method can include processing the informational element. Moreover, the method may include transmitting an acknowledgement indicating that the informational element was successfully processed.

Another aspect relates to a communications apparatus enabled to improve USSD based messaging options. The communications apparatus can include means for receiving, by a MS, an USSD based message with an informational element using a common channel. Further, the communications apparatus can include means for processing the informational element. Moreover, the communications apparatus can include means for transmitting an acknowledgement indicating that the informational element was successfully processed.

Another aspect relates to a communications apparatus. The apparatus can include a processing system configured to receive, by a MS, an USSD based message with an informational element using a common channel. Further, the processing system may be configured to process the informational element. Moreover, the processing system may further be configured to transmit an acknowledgement indicating that the informational element was successfully processed.

Still another aspect relates to a computer program product, which can have a computer-readable medium including code for receiving, by a MS, an USSD based message with an informational element using a common channel. Further, the computer-readable medium may include code for processing the informational element. Moreover, the computer-readable medium can include code for transmitting an acknowledgement indicating that the informational element was successfully processed.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
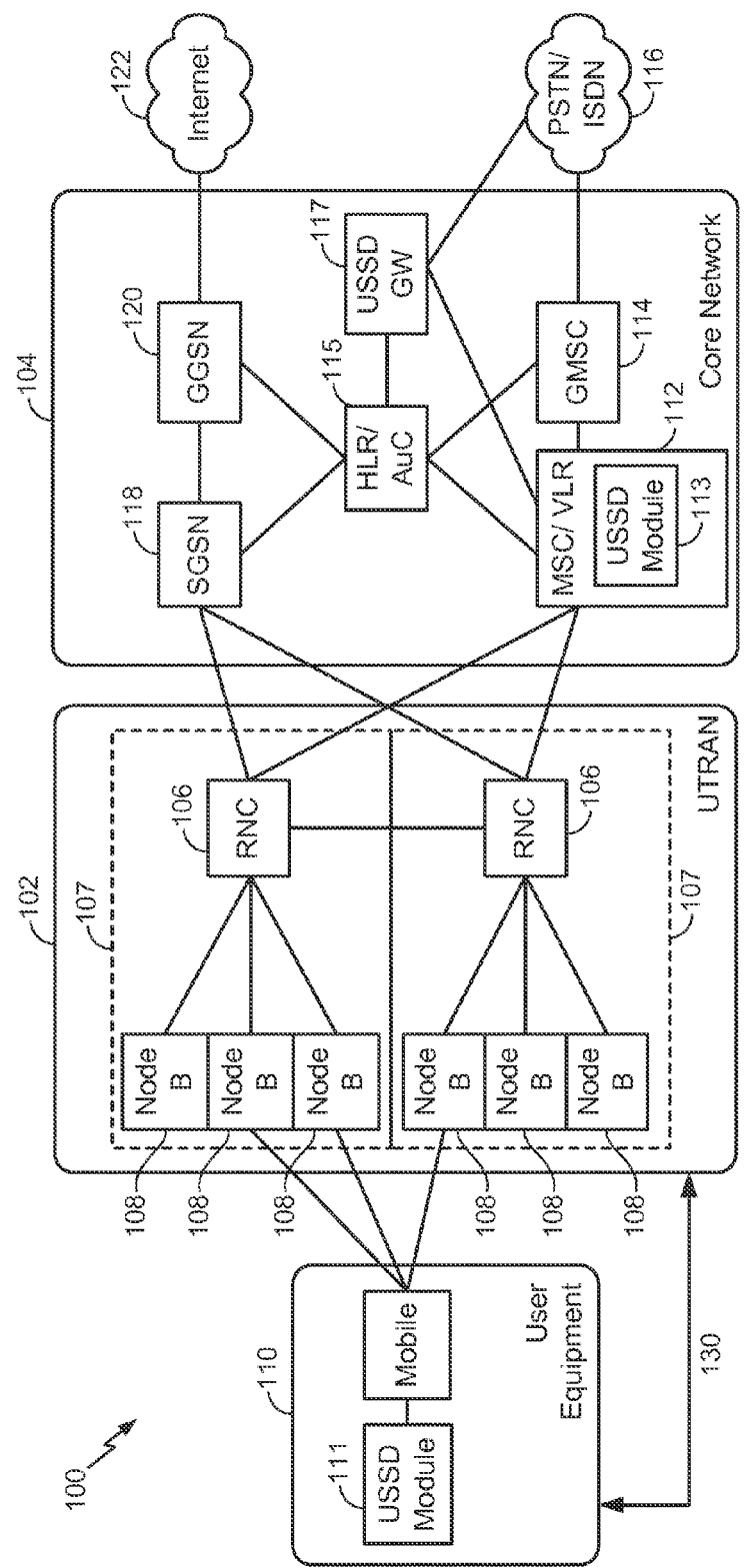
FIG. 1 is a diagram illustrating an example of an access network architecture according to some embodiments.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

By way of example and without limitation, the aspects of the present disclosure illustrated in FIG. 1 are presented with reference to a UMTS system 100 employing a W-CDMA air interface and/or CDMA2000 air interface. A UMTS network includes three interacting domains: a Core Network (CN) 104, a UMTS Terrestrial Radio Access Network (UTRAN) 102, and User Equipment (UE) 110. In this example, the UTRAN 102 provides various wireless services including telephony, video, data, messaging, broadcasts, and/or other services. The UTRAN 102 may include a plurality of Radio Network Subsystems (RNSs) such as an RNS 107, each controlled by a respective Radio Network Controller (RNC) such as an RNC 106. Here, the UTRAN 102 may include any number of RNCs 106 and RNSs 107 in addition to the RNCs 106 and RNSs 107 illustrated herein. The RNC 106 is an apparatus responsible for, among other things, assigning, reconfiguring, and releasing radio resources within the RNS 107. The RNC 106 may be interconnected to other RNCs (not shown) in the UTRAN 102 through various types of interfaces such as a direct physical connection, a virtual network, or the like, using any suitable transport network.

Communication between a UE 110 and a Node B 108 may be considered as including a physical (PHY) layer and a medium access control (MAC) layer. Further, communication between a UE 110 and an RNC 106 by way of a respective Node B 108 may be considered as including a radio resource control (RRC) layer. In the instant specification, the PHY layer may be considered layer 1; the MAC layer may be considered layer 2; and the RRC layer may be considered layer 3. Information hereinbelow utilizes terminology introduced in the RRC Protocol Specification, 3GPP TS 25.331 v9.1.0, incorporated herein by reference.

The geographic region covered by the RNS 107 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, three Node Bs 108 are shown in each RNS 107; however, the RNSs 107 may include any number of wireless Node Bs. The Node Bs 108 provide wireless access points to a CN 104 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as a UE in UMTS applications, but may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology. In a UMTS system, the UE 110 may further include a USSD module 111, which may be configured to process USSD based messages received over a traffic channel 130 and/or a common (e.g., paging) channel. For illustrative purposes, one UE 110 is shown in communication with a number of the Node Bs 108. The DL, also called the forward link, refers to the communication link from a Node B 108 to a UE 110, and the UL, also called the reverse link, refers to the communication link from a UE 110 to a Node B 108.

The CN 104 interfaces with one or more access networks, such as the UTRAN 102. As shown, the CN 104 is a GSM core network. However, as those skilled in the art will recognize, the various concepts presented throughout this disclosure may be implemented in a RAN, or other suitable access network, to provide UEs with access to types of CNs other than GSM networks.

The CN 104 includes a circuit-switched (CS) domain and a packet-switched (PS) domain. Some of the circuit-switched elements are a Mobile services Switching Centre (MSC) 112, a Visitor location register (VLR), USSD gateway (USSD GW), and a Gateway MSC. USSD GW may be configured to allow a UE 110 user and a network entity (e.g., PLMN 116) application to communicate in a way which is transparent to the UE and to intermediate network entities. Packet-switched elements include a Serving GPRS Support Node (SGSN) and a Gateway GPRS Support Node (GGSN). Some network elements, like EIR, HLR, VLR and AuC may be shared by both of the circuit-switched and packet-switched domains. In the illustrated example, the CN 104 supports circuit-switched services with a MSC 112 and a GMSC 114. In some applications, the GMSC 114 may be referred to as a media gateway (MGW). One or more RNCs, such as the RNC 106, may be connected to the MSC 112. The MSC 112 is an apparatus that controls call setup, call routing, and UE mobility functions. The MSC 112 may also include a VLR that contains subscriber-related information for the duration that a UE is in the coverage area of the MSC 112. The GMSC 114 provides a gateway through the MSC 112 for the UE to access a circuit-switched network 116. The GMSC 114 includes a home location register (HLR) 115 containing subscriber data, such as the data reflecting the details of the services to which a particular user has subscribed. The HLR is also associated with an authentication center (AuC) that contains subscriber-specific authentication data. When a call is received for a particular UE, the GMSC 114 queries the HLR 115 to determine the UE's location and forwards the call to the particular MSC serving that location.

The CN 104 also supports packet-data services with a serving General Packet Radio Service (GPRS) support node (SGSN) 118 and a gateway GPRS support node (GGSN) 120. GPRS is designed to provide packet-data services at speeds higher than those available with standard circuit-switched data services. The GGSN 120 provides a connection for the UTRAN 102 to a packet-based network 122. The packet-based network 122 may be the Internet, a private data network, or some other suitable packet-based network. The primary function of the GGSN 120 is to provide the UEs 110 with packet-based network connectivity. Data packets may be transferred between the GGSN 120 and the UEs 110 through the SGSN 118, which performs primarily the same functions in the packet-based domain as the MSC 112 performs in the circuit-switched domain.

An air interface for UMTS may utilize a spread spectrum Direct-Sequence Code Division Multiple Access (DS-CDMA) system. The spread spectrum DS-CDMA spreads user data through multiplication by a sequence of pseudorandom bits called chips. The "wideband" W-CDMA air interface for UMTS is based on such direct sequence spread spectrum technology and additionally calls for a frequency division duplexing (FDD). FDD uses a different carrier frequency for the UL and DL between a Node B 108 and a UE 110. Another air interface for UMTS that utilizes DS-CDMA, and uses time division duplexing (TDD), is the TD-SCDMA air interface. Those skilled in the art will recognize that although various examples described herein may refer to a W-CDMA air interface, the underlying principles may be equally applicable to a TD-SCDMA air interface.

Another air interface that may be used for UMTS may be CDMA2000. In an aspect, the CDMA2000 air interface may support use of USSD based messaging. In such an aspect, a new Service Indicator, (e.g., CDMA M2M, etc.), which is inserted as Service Indicator parameter within a Mobile Application Part (MAP) SMS Delivery Point-To-Point (SM-DPP) message constructed by the USSD GW 117 and sent to the Switch MSC/MSCe 112. In an operational aspect, upon receipt of this Service Indicator type, the MSC/MSCe 112 USSD module 113 may determine that the USSD based message is for M2M triggering and, in response to the determination, USSD module 113 may prompt a base station (e.g., Node N 108) to use a common (e.g., paging channel) to transmit the USSD message to the mobile station (e.g., UE 110). Further description of CDMA2000 support for USSD based messaging is provided with reference to the call flow diagrams recited in FIGS. 3 and 4.

Figure 2:
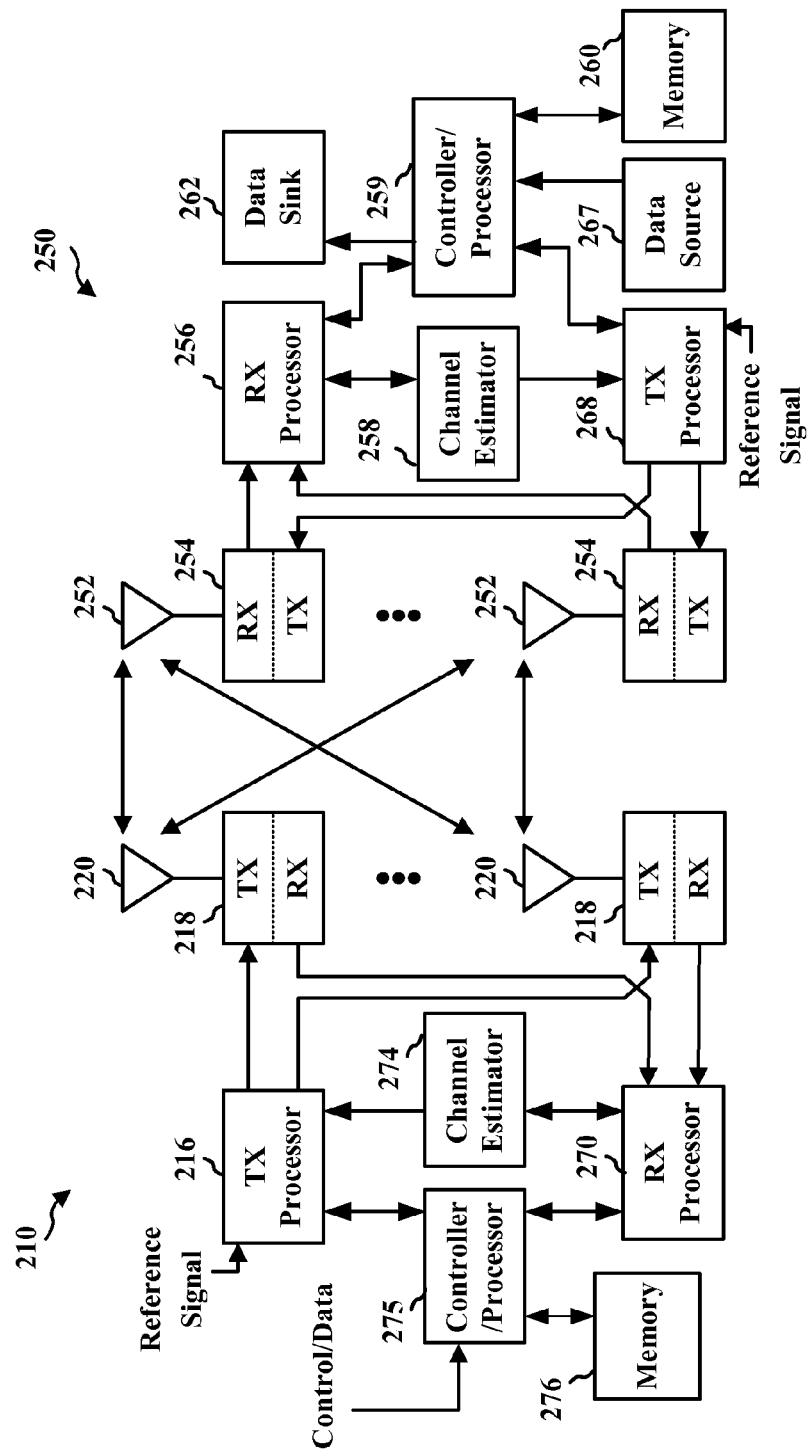
FIG. 2 is a diagram illustrating an example of a network entity and user equipment in an access network according to some embodiments.

FIG. 2 is a block diagram of a network entity 210 (e.g., eNB, an MSC, USSD GW, etc.) in communication with a UE 250 in an access network. In the DL, upper layer packets from the core network are provided to a controller/processor 275. The controller/processor 275 implements the functionality of the L2 layer. In the DL, the controller/processor 275 provides header compression, ciphering, packet segmentation and reordering, multiplexing between logical and transport channels, and radio resource allocations to the UE 250 based on various priority metrics. The controller/processor 275 is also responsible for HARQ operations, retransmission of lost packets, and signaling to the UE 250.

The transmit (TX) processor 216 implements various signal processing functions for the L1 layer (i.e., physical layer). The signal processing functions includes coding and interleaving to facilitate forward error correction (FEC) at the UE 250 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 274 may be used to determine the coding and modulation scheme, as well as for spatial processing. The channel estimate may be derived from a reference signal and/or channel condition feedback transmitted by the UE 250. Each spatial stream is then provided to a different antenna 220 via a separate transmitter 218TX. Each transmitter 218TX modulates an RF carrier with a respective spatial stream for transmission.

At the UE 250, each receiver 254RX receives a signal through its respective antenna 252. Each receiver 254RX recovers information modulated onto an RF carrier and provides the information to the receive (RX) processor 256. The RX processor 256 implements various signal processing functions of the L1 layer. The RX processor 256 performs spatial processing on the information to recover any spatial streams destined for the UE 250. If multiple spatial streams are destined for the UE 250, they may be combined by the RX processor 256 into a single OFDM symbol stream. The RX processor 256 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the network entity 210. These soft decisions may be based on channel estimates computed by the channel estimator 258. The soft decisions are then decoded and deinterleaved to recover the data and control signals that were originally transmitted by the network entity 210 on the physical channel. The data and control signals are then provided to the controller/processor 259.

The controller/processor 259 implements the L2 layer. The controller/processor can be associated with a memory 260 that stores program codes and data. The memory 260 may be referred to as a computer-readable medium. In the UL, the controller/processor 259 provides demultiplexing between transport and logical channels, packet reassembly, deciphering, header decompression, control signal processing to recover upper layer packets from the core network. The upper layer packets are then provided to a data sink 262, which represents all the protocol layers above the L2 layer. Various control signals may also be provided to the data sink 262 for L3 processing. The controller/processor 259 is also responsible for error detection using an acknowledgement (ACK) and/or negative acknowledgement (NACK) protocol to support HARQ operations.

In the UL, a data source 267 is used to provide upper layer packets to the controller/processor 259. The data source 267 represents all protocol layers above the L2 layer. Similar to the functionality described in connection with the DL transmission by the network entity 210, the controller/processor 259 implements the L2 layer for the user plane and the control plane by providing header compression, ciphering, packet segmentation and reordering, and multiplexing between logical and transport channels based on radio resource allocations by the network entity 210. The controller/processor 259 is also responsible for HARQ operations, retransmission of lost packets, and signaling to the network entity 210.

Channel estimates derived by a channel estimator 258 from a reference signal or feedback transmitted by the network entity 210 may be used by the TX processor 268 to select the appropriate coding and modulation schemes, and to facilitate spatial processing. The spatial streams generated by the TX processor 268 are provided to different antenna 252 via separate transmitters 254TX. Each transmitter 254TX modulates an RF carrier with a respective spatial stream for transmission.

The UL transmission is processed at the network entity 210 in a manner similar to that described in connection with the receiver function at the UE 250. Each receiver 218RX receives a signal through its respective antenna 220. Each receiver 218RX recovers information modulated onto an RF carrier and provides the information to a RX processor 270. The RX processor 270 may implement the L1 layer.

The controller/processor 275 implements the L2 layer. The controller/processor 275 can be associated with a memory 276 that stores program codes and data. The memory 276 may be referred to as a computer-readable medium. In the UL, the control/processor 275 provides demultiplexing between transport and logical channels, packet reassembly, deciphering, header decompression, control signal processing to recover upper layer packets from the UE 250. Upper layer packets from the controller/processor 275 may be provided to the core network. The controller/processor 275 is also responsible for error detection using an ACK and/or NACK protocol to support HARQ operations.

FIGS. 3, 4, 5, 8, and 11 illustrate various methodologies in accordance with various aspects of the presented subject matter. While, for purposes of simplicity of explanation, the methodologies are shown and described as a series of acts or sequence steps, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Figure 3:
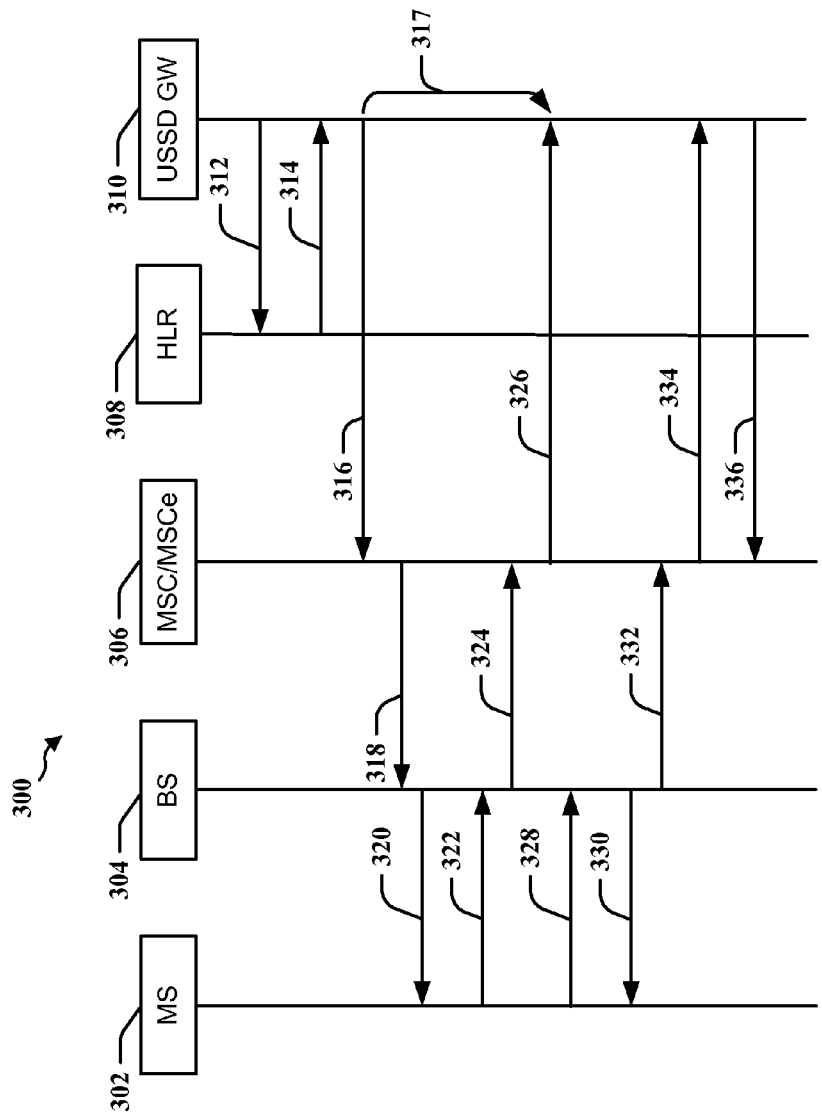
FIG. 3 is a call flow diagram illustrating an example network initiated USSD message scheme on a common channel according to some embodiments.

FIG. 3 is a call flow diagram illustrating an access network 300 that is configured to support USSD messaging via a common channel, according to an aspect. The access network may include a MS 302, base station (BS) 304, MSC 306, HLR 308, and USSD GW 310.

At act 312, if the USSD GW 310 does not have the address of the MSC 306 currently serving the MS, USSD GW 310 may send a SMSREQ to HLR 308.

At act, 314, if the HLR 308 has the current address of the indicated MS-based USSD Client 302, the HLR 308 may send a smsreq to the requesting USSD GW 310.

The USSD GW 310 may construct a MAP SMDPP INVOKE message, in which the SMS_BearData parameter may contain a USSD Notify. Further, the ServiceIndicator parameter may be set to a service indicator such as but not limited to CDMA M2M. In an aspect, the USSD Notify is formatted as defined in [C.S0105]. Thereafter, at act 316, The SMDPP INVOKE may be sent to the MSC/MSCe 306, at act 317 The USSD Gateway 310 may start timer SMT.

At act 318, upon receipt of the SMDPP INVOKE message, the MSC/MSCe 306 may determine if the subscriber MS 302 is authorized to use USSD services by examining the subscriber profile. By contrast, if the subscriber is not authorized, the MSC/MSCe 306 may send a cause code in the smdpp, such as at act 326. If the subscriber profile contains a USSDAddress parameter, the MSC/MSCe 306 my cache the address which originated the SMDPP INVOKE until the USSD session is complete. The MSC/MSCe 306 may also determine by the type of the ServiceIndicator parameter that the common channel is to be used to transfer this USSD notify. Further, the MSC/MSCe 306 may constructs an IOS ADDS Page message with the Data Burst Type of the ADDS User Data Informational Element set to indicate USSD. In an aspect, the SMS_BearData parameter of the MAP SMDPP INVOKE may be used to create the Application Data Message of the ADDS User Data Informational Element. Thereafter, at act 318, the MSC 306 may send the IOS ADDS Page message to the BS 304.

At act 320, the BS 304 may transmit the USSD Notify message over the common channel. If the BS 304 does not receive an acknowledgment after transmitting the USSD data burst message, it retransmits the message. In an aspect, the maximum number of the retransmissions is configurable. In such an aspect, when the BS 304 reaches the maximum number of retransmissions, the BS 304 may declare a Layer 2 Ack failure and initiates call clearing.

At act, 322, the MS 302 may acknowledge (Ack) receipt of the data burst message with a Layer 2 Ack on the access channel.

At act 324, if the MSC/MSCe 306 has requested a response by including the tag element in the ADDS Page message, the BS 304 replies with an ADDS Page Ack message when it has received an acknowledgment from the MS 302 that the USSD USSD Notify message was delivered. If a Tag element was included in the ADDS Page message, the BS 304 may include the Tag element in the ADDS Page Ack message, and set it to the same value as that received in the ADDS Page message.

At act 326, the MSC/MSCe 306 may acknowledge the MAP SMDPP INVOKE message from at 316 by sending an SMDPP RETURN RESULT to the USSD GW 310. In an aspect, upon receiving the MAP SMDPP RETURN RESULT, completing act 317, the USSD GW 310 stops timer SMT.

At act 328, the BS 304 may receive a data burst message from an MS 302 on the access channel with a burst type indicating USSD. In an aspect, the data burst message can contain USSD Release message. In such an aspect, the USSD DBM may be constructed as defined in [C.S0105].

At act 330, if a Layer 2 Ack was requested by the MS 302, the BS 304 may send a Layer 2 Ack to the MS 302 on the common channel.

At act, 332, the BS 304 may send an ADDS Transfer message to the MSC/MSCe 306. In an aspect the Application Data Message of the ADDS User Data Informational Element may contain the USSD DBM received from the MS 302. In such an aspect, the Data Burst Type of the ADDS User Data Informational Element may be set to USSD.

At act 334, the MSC/MSCe 306 may construct a MAP SMDPP INVOKE. The SMS_BearData is constructed from the ADDS User Part in the ADDS Page message containing the USSD response message as defined in [T524.080]. The SMDPP INVOKE may be sent to the address cached at act 318. In an aspect, the MSC/MSCe 306 may starts timer SMT.

At act, 336, the USSD GW 310 may acknowledge the MAP SMDPP INVOKE by sending an SMDPP RETURN RESULT to the MSC/MSCe 306. Upon receiving the MAP SMDPP RETURN RESULT the MSC/MSCe 306 may stop timer SMT.

Figure 4:
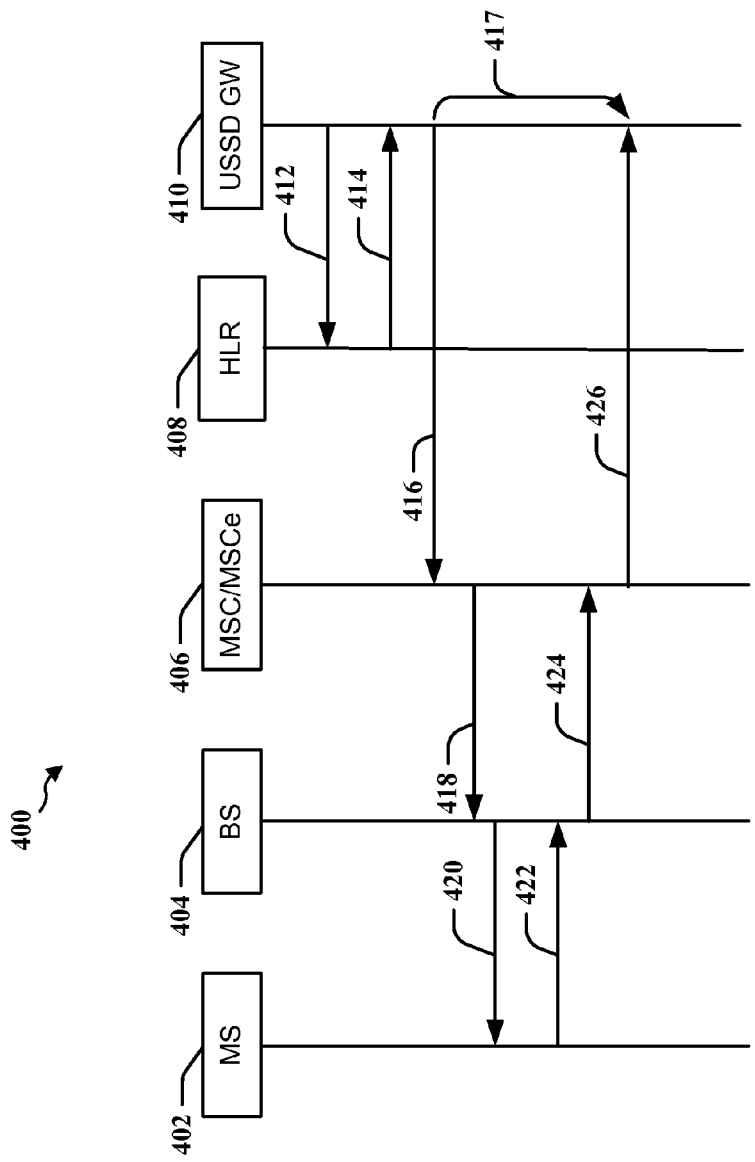
FIG. 4 is a call flow diagram illustrating another example network initiated USSD message scheme on a common channel according to some embodiments.

FIG. 4 is a call flow diagram illustrating an access network 400 that is configured to support USSD messaging via a common channel, according to an aspect. The access network may include a MS 402, base station (BS) 404, MSC 406, HLR 408, and USSD GW 410.

At act 412, if the USSD GW 410 does not have the address of the MSC 406 currently serving the MS, USSD GW 410 may send a SMSREQ to HLR 408.

At act, 414, if the HLR 408 has the current address of the indicated MS-based USSD Client 402, the HLR 408 may send a smsreq to the requesting USSD GW 410.

The USSD GW 410 may construct a MAP SMDPP INVOKE message, in which the SMS_BearData parameter may contain a USSD Notify. Further, the ServiceIndicator parameter may be set to service indicator such as but not limited to CDMA M2M. In an aspect, the USSD Notify is formatted as defined in [C.S0105]. Thereafter, at act 416, The SMDPP INVOKE may be sent to the MSC/MSCe 406, at act 417 The USSD Gateway 410 may start timer SMT.

At act 418, upon receipt of the SMDPP INVOKE message, the MSC/MSCe 406 may determine if the subscriber MS 402 is authorized to use USSD services by examining the subscriber profile. By contrast, if the subscriber is not authorized, the MSC/MSCe 406 may send a cause code in the smdpp, such as at act 426. If the subscriber profile contains a USSDAddress parameter, the MSC/MSCe 406 my cache the address which originated the SMDPP INVOKE until the USSD session is complete. The MSC/MSCe 406 may also determine by the type of the ServiceIndicator parameter that the common channel is to be used to transfer this USSD notify. Further, the MSC/MSCe 406 may constructs an IOS ADDS Page message with the Data Burst Type of the ADDS User Data Informational Element set to indicate USSD. In an aspect, the SMS_BearData parameter of the MAP SMDPP INVOKE may be used to create the Application Data Message of the ADDS User Data Informational Element. The MSC/MSCe 406 may also determine that a response from BS 404 is needed by including the tag element in the ADDS Page message. In an aspect, this response may be employed to encapsulate the USSD Release. Thereafter, at act 418, the MSC 406 may send the IOS ADDS Page message to the BS 404.

At act 420, the BS 404 may transmit the USSD Notify message over the common channel. If the BS 404 does not receive an acknowledgment after transmitting the USSD data burst message, it retransmits the message. In an aspect, the maximum number of the retransmissions is configurable. In such an aspect, when the BS 404 reaches the maximum number of retransmissions, the BS 404 may declare a Layer 2 Ack failure and initiates call clearing.

At act, 422, the MS 402 may acknowledge (Ack) receipt of the data burst message with a Layer 2 containing a data burst message with a burst type indicating USSD on the access channel. In an aspect, the data burst message contains a USSD Release message. The USSD DBM is constructed as defined in [C.S0105].

At act 424, MSC/MSCe 406 has requested a response by including the tag element in the ADDS Page message, thus the BS 404 replies with an ADDS Page Ack upon receipt of the Layer 2 Ack. In an aspect, the ADDS Page Ack may contain a USSD DBM. In such an aspect, the BS 404 may include the Tag element in the ADDS Page Ack message, and set it to the same value as that received in the ADDS Page message.

At act 426, the MSC/MSCe 406 may acknowledge the MAP SMDPP INVOKE message from at 416 by sending an SMDPP RETURN RESULT to the USSD GW 410. In an aspect, the SMS_BearData may be constructed from the ADDS User Part in the ADDS Page Ack containing the USSD Release as defined in [TS24.080]. In an aspect, upon receiving the MAP SMDPP RETURN RESULT, completing act 417, the USSD GW 410 stops timer SMT.

Figure 5:
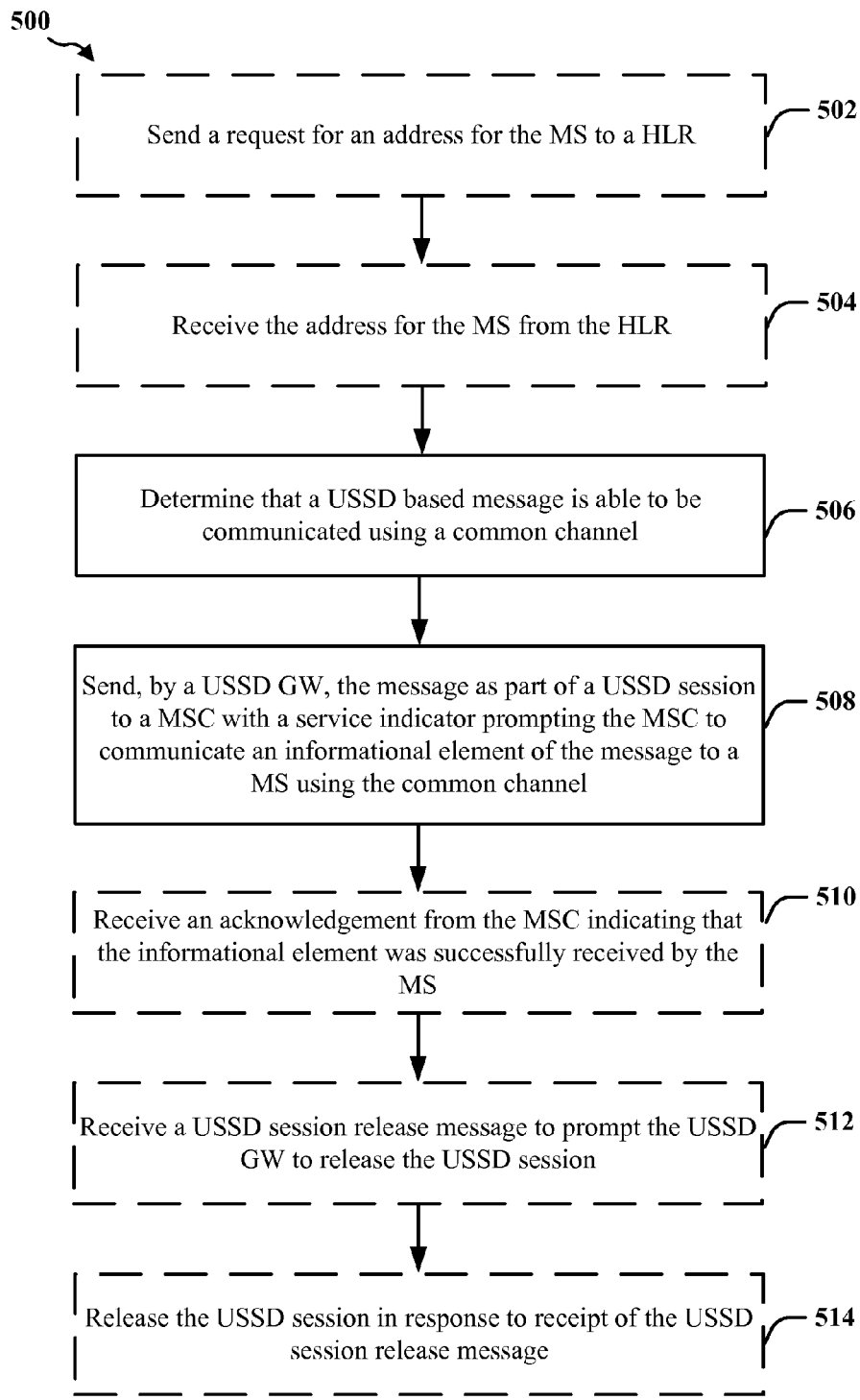
FIG. 5 is a flow chart illustrating an example network initiated USSD message scheme on a common channel according to some embodiments.

FIG. 5 is a flow chart 500 of a method of wireless communication. The method may be performed by a network entity (e.g., USSD GW 117).

In an optional aspect, at block 502, the network entity may send a request for an address for the MS of interest to a home location register (HLR). In an aspect, the message may be a SMSREQ message. In an aspect, the sending may be performed by transmission module 608. In another aspect, a determination that an address for the MS of interest is not available to the USSD GW may be performed by MS address module 610.

In another optional aspect, at block 504, the network entity may receive the address for the MS of interest from the HLR. In an aspect, a reception module 604 may be configured to receive the message from the HLR. In an aspect, the received message may be a smsreq message.

At block 506, the network entity may determine that a USSD based message is able to be communicated using a common channel. In an aspect, a USSD common channel module 606 may be configured to perform the determination. In an aspect, the determination may be based on the size of the USSD message to be sent (e.g., below a threshold size), the purpose of the message (e.g., M2M triggering), etc.

At block 508, the network entity may send the USSD based message as part of a USSD session to a MSC with a service indicator prompting the MSC to communicate an informational element of the message to a MS using the common channel. In an aspect the USSD based message may be send using transmission module 608. In such an aspect, the network entity may also initiate a timer when the message is send. In such an aspect, the timer may be initiated using USSD common channel module 606.

In another aspect, the USD based message may be a USSD DBM and the informational element may be a USSD Notify informational element. In another aspect, transmission module 608 is configured to send the message using a SMS Delivery Point-To-Point (SMDPP) format, and the service indicator may be a code division multiple access (CDMA) M2M service indicator.

In an optional aspect, at block 510, the network entity may receive an acknowledgement from the MSC indicating that the informational element was successfully received by the MS. In an aspect the acknowledgment message may be received using reception module 604. In another aspect, USSD common channel module 606 may be configured to stop the timer upon receipt of the Ack message. In another aspect, the Ack message may further include a USSD session release informational element. In such an aspect, the USSD common channel module 606 may be configured to end the USSD session.

In another optional aspect, at block 512, the network entity may receive a USDD session release message. In such an aspect, the USSD session release message may be received using reception module 604.

In another optional aspect, at block 514, the network entity may release the USSD session. In such an aspect, USSD common channel module 606 may be configured to end the USSD session.

Figure 6:
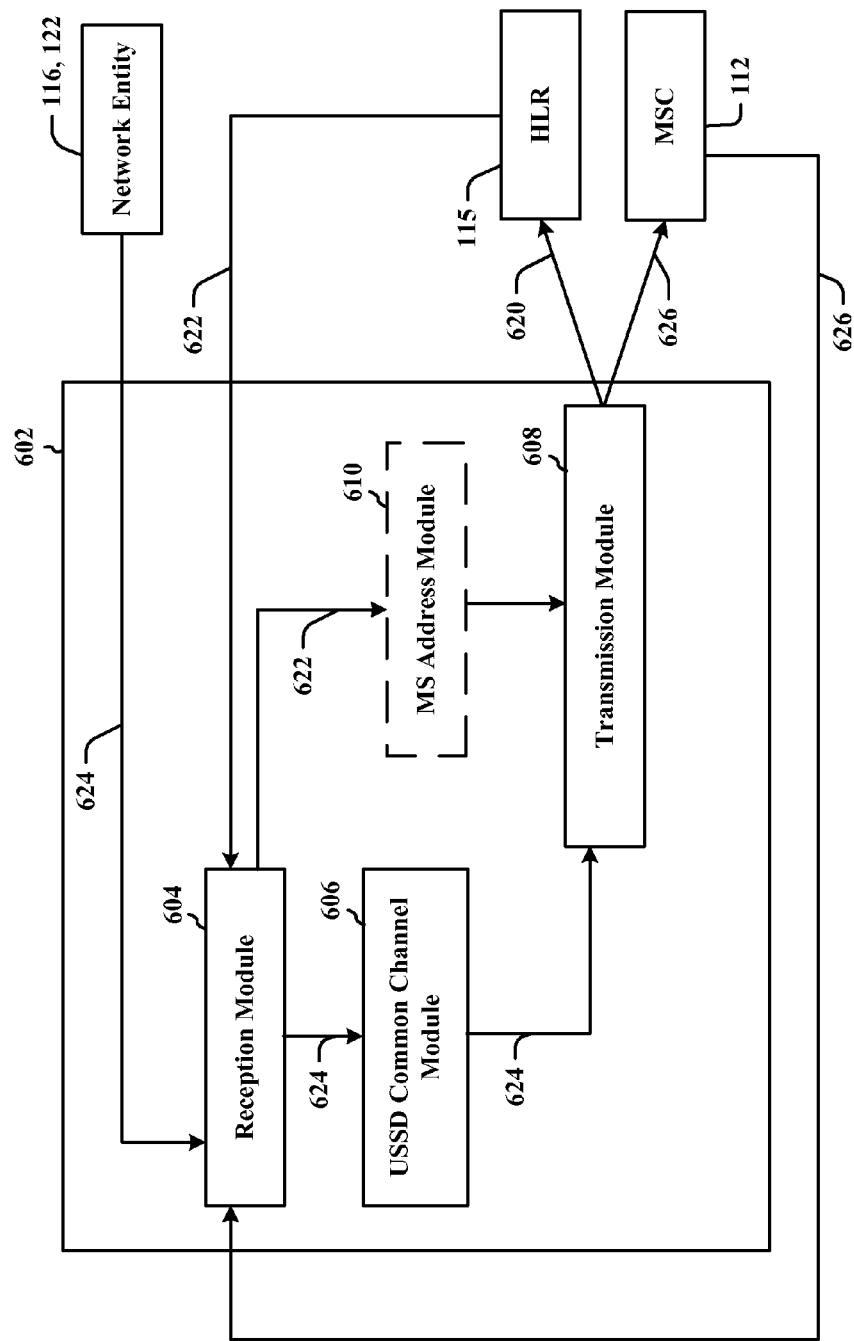
FIG. 6 is a conceptual data flow diagram illustrating the data flow between different modules/means/components according to some embodiments.

FIG. 6 is a conceptual data flow diagram 600 illustrating the data flow between different modules/means/components in an exemplary apparatus 602. The apparatus may be a network entity, such as but not limited to, a USSD GW 117. As noted above with reference to FIG. 5, the apparatus includes a reception module 604, a USSD common channel module 606, a transmission module 608, and a MS address module 610.

In an operational aspect, apparatus 602 may receive, through reception module 504, a USSD based message 624. Reception module 604 may provide the USSD based message 624 to USSD common channel module 606 for processing. In an aspect, USSD common channel module 606 may determine that the USSD based message 624 is able to be communicated, via transmission module 608, using a common channel. In such an aspect, the transmission module 608 may send USSD based message 624 as part of a USSD session 626 to a MSC with a service indicator prompting the MSC to communicate an informational element of the message to a MS using the common channel. In an aspect, reception module 604 may receive message 628 from the MSC 112 with an acknowledgement indicating that the informational element was successfully received by the MS. In another aspect, the message 628 may include information prompting the apparatus to release the USSD session. In another aspect in which the apparatus does not have an address for the MS, apparatus 602 may send, via transmission module 608, an address request 620 to the HLR 115. In such an aspect, in response to the address request, the reception module 604 may receive the MS address 622 and provide it to MS address module 610.

The apparatus may include additional modules that perform each of the steps of the algorithm in the aforementioned call flows and/or flow chart of FIGS. 3, 4, and 5. As such, each step in the aforementioned FIGS. 3, 4, and 5 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 7:
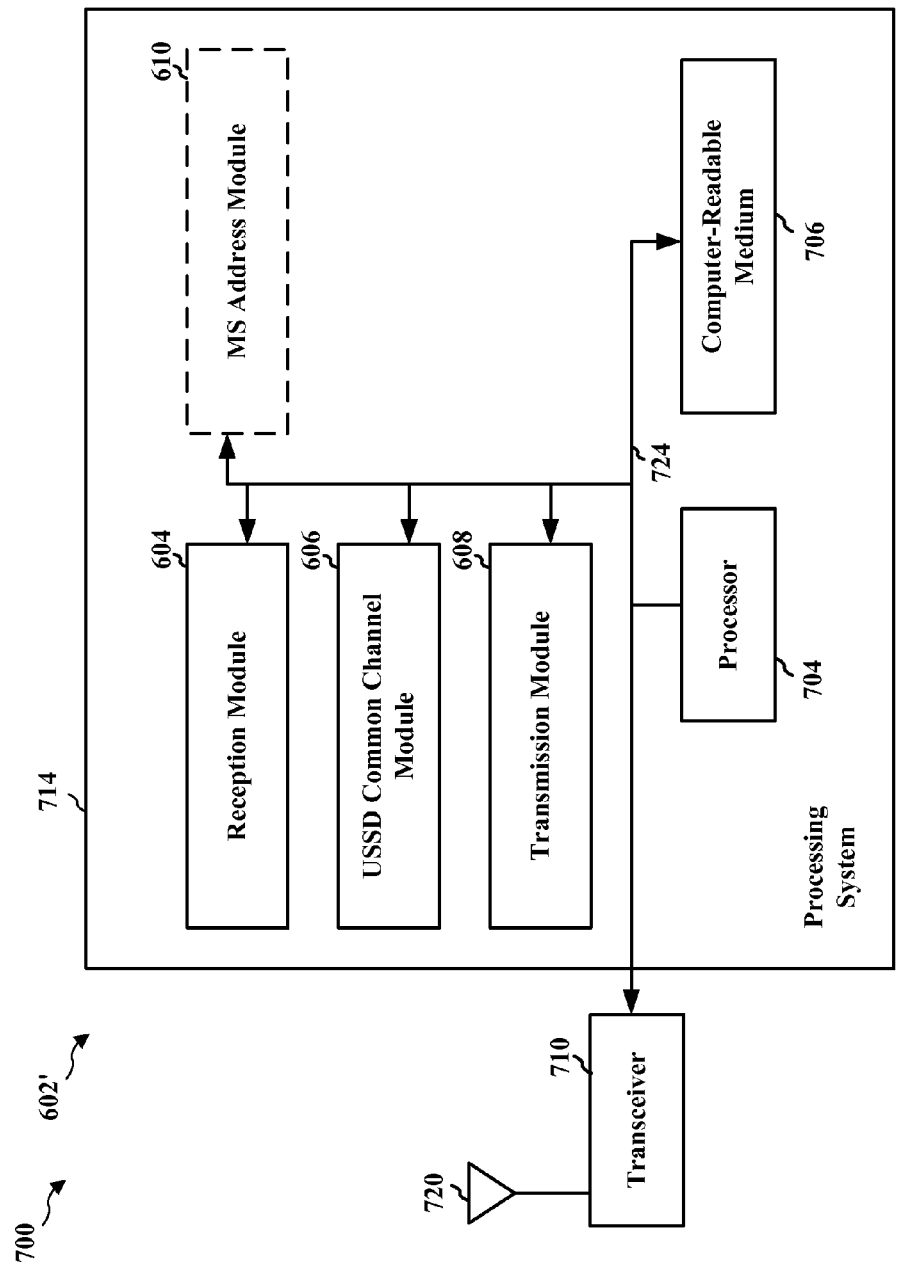
FIG. 7 is a diagram illustrating an example of a hardware implementation for an apparatus employing a processing system according to some embodiments.

FIG. 7 is a diagram 700 illustrating an example of a hardware implementation for an apparatus 602' employing a processing system 714. The processing system 714 may be implemented with a bus architecture, represented generally by the bus 724. The bus 724 may include any number of interconnecting buses and bridges depending on the specific application of the processing system 714 and the overall design constraints. The bus 724 links together various circuits including one or more processors and/or hardware modules, represented by the processor 704, the modules 604, 606, 608, 610, and the computer-readable medium 706. The bus 724 may also link various other circuits such as timing sources, peripherals, voltage regulators, and power management circuits, which are well known in the art, and therefore, will not be described any further.

The processing system 714 may be coupled to a transceiver 710. The transceiver 710 is coupled to one or more antennas 720. The transceiver 710 provides a means for communicating with various other apparatus over a transmission medium. The processing system 714 includes a processor 704 coupled to a computer-readable medium 706. The processor 704 is responsible for general processing, including the execution of software stored on the computer-readable medium 706. The software, when executed by the processor 704, causes the processing system 714 to perform the various functions described supra for any particular apparatus. The computer-readable medium 706 may also be used for storing data that is manipulated by the processor 704 when executing software. The processing system further includes at least one of the modules 604, 606, 608, and 610. The modules may be software modules running in the processor 704, resident/stored in the computer readable medium 706, one or more hardware modules coupled to the processor 704, or some combination thereof. The processing system 714 may be a component of the network entity 210 and may include the memory 276 and/or at least one of the TX processor 216, the RX processor 270, and the controller/processor 275.

In one configuration, the apparatus 602/602' for wireless communication includes means for determining that a USSD based message is able to be communicated using a common channel, and means for sending the USSD based message as part of a USSD session to a MSC with a service indicator prompting the MSC to communicate an informational element of the message to a MS using the common channel. In an aspect, the message may be determined to be able to be communicated using the common channel when a size of the informational element is smaller than a threshold size. In an aspect, apparatus 602/602' may further provide means for receiving an acknowledgement from the MSC indicating that the informational element was successfully received by the MS. In an aspect, the acknowledgement may also include a USSD session release informational element to prompt the USSD GW to release the USSD session. In an aspect, apparatus 602/602' may further provide means for sending a request for an address for the MS to a HLR, and means for receiving the address for the MS from the HLR, wherein the message further includes the address for the MS. As described supra, the processing system 714 may include the TX Processor 216, the RX Processor 270, and the controller/processor 275. As such, in one configuration, the aforementioned means may be the TX Processor 216, the RX Processor 270, and the controller/processor 275 configured to perform the functions recited by the aforementioned means.

Figure 8:
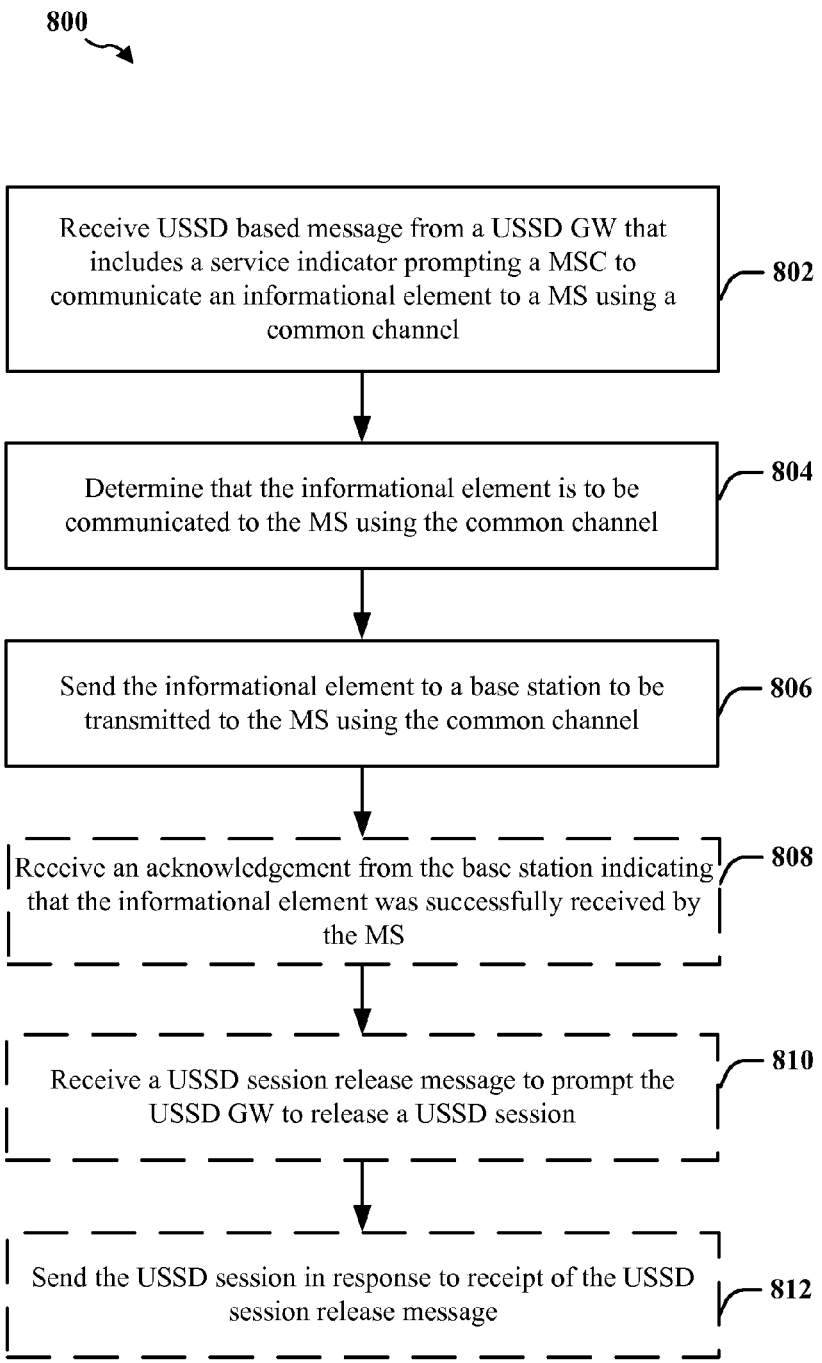
FIG. 8 is a flow chart diagram illustrating another example network initiated USSD message scheme on a common channel according to some embodiments.

FIG. 8 is a flow chart 800 of a method of wireless communication. The method may be performed by a network entity (e.g., MSC 112).

At block 802, the network entity may receiving a USSD based message from a USSD GW that includes a service indicator prompting the MSC to communicate an informational element to a MS using a common channel. In an aspect, the reception module 904 may be configured to receive the USSD based message using a SMDPP format. Further, the service indicator may be a CDMA M2M service indicator. In another aspect, the USSD based message may be a USSD data burst message (DBM), and the informational element may be a USSD Notify informational element. In an aspect, the receiving may be performed using reception module 904.

At block 804, the network entity may determine that the informational element is to be communicated to the MS using the common channel. In an aspect, the determination may be performed using USSD common channel processing module 906.

At block 806, the network entity may send the informational element to a base station to be transmitted to the MS using the common channel. In an aspect, the sending may be performed using transmission module 908. In an aspect, transmission module 908 may be configured to send the informational element using an ADDS page message.

In an optional aspect, at block 808, the network entity may receive an acknowledgement from the base station indicating that the informational element was successfully received by the MS. In an aspect, the acknowledgement may include a USSD session release informational element to prompt the USSD GW to release a USSD session. In an aspect, the receiving may be performed using reception module 904.

In another optional aspect, at block 810, the network entity may receive a USSD session release message to prompt the USSD GW to release a USSD session. In an aspect, the receiving may be performed using reception module 904. In an aspect, the USSD session release message may be received using an ADDS transfer message.

In another optional aspect, at block 812, the network entity may send the USSD session in response to receipt of the USSD session release message. In an aspect, transmission module 908 may be configured to send the USSD session release to the USSD GW.

Figure 9:
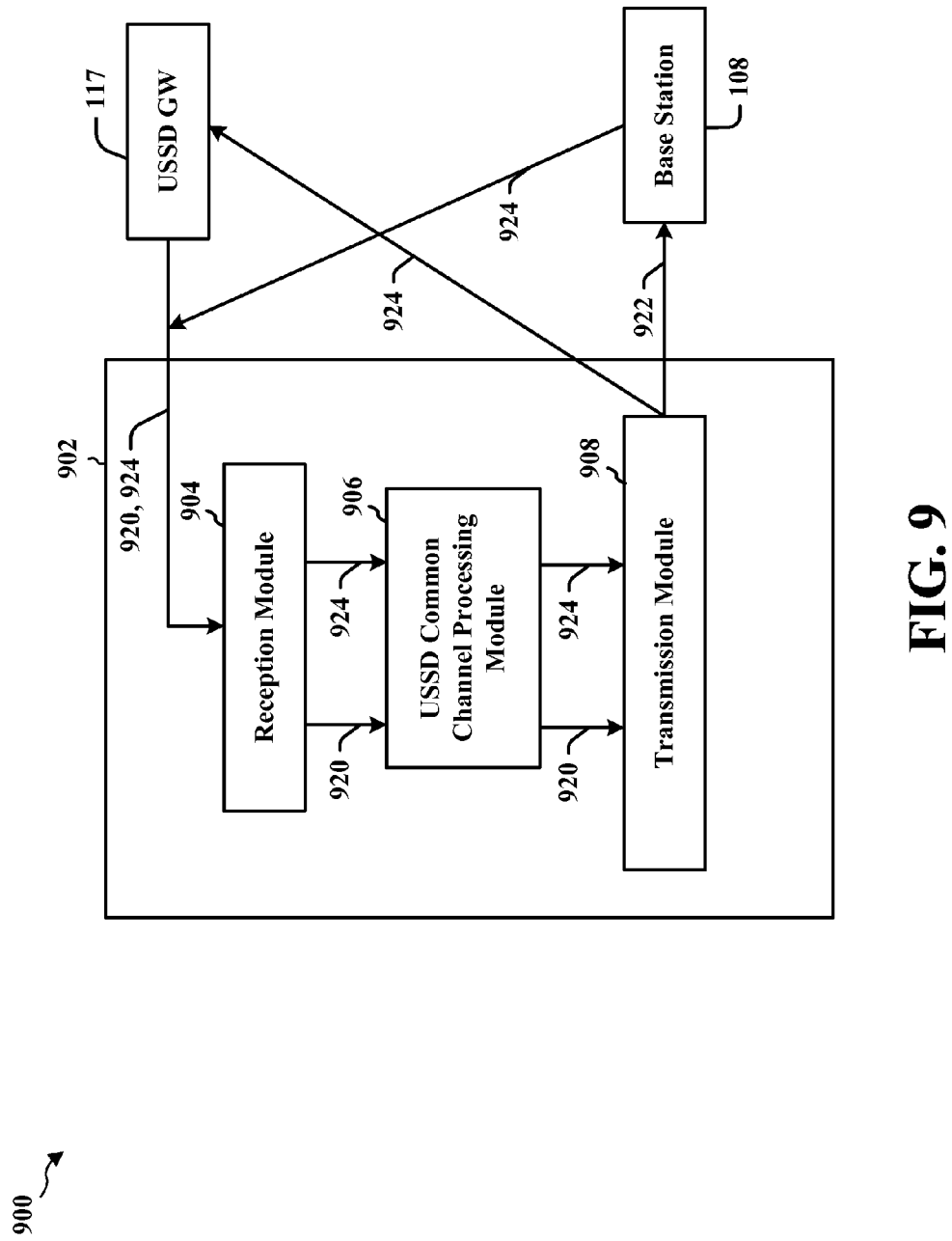
FIG. 9 is a conceptual data flow diagram illustrating the data flow between different modules/means/components according to some embodiments.

FIG. 9 is a conceptual data flow diagram 900 illustrating the data flow between different modules/means/components in an exemplary apparatus 902. The apparatus may be a MSC. As noted with reference to FIG. 8, the apparatus includes a reception module 904, a USSD common channel processing module 906, and a transmission module 908.

In an operational aspect, apparatus 902 may receive, via reception module 904, a USSD based message 920 from a USSD GW that includes a service indicator prompting the apparatus 902 to communicate an informational element to a MS using a common channel. The reception module 904 may provide the USSD based message 920 to the USSD common channel processing module 906 for processing. In an aspect, USSD common channel processing module 906 may determine whether the informational element included with the USSD based message 920 is to be communicated to the MS using the common channel. Upon a determination that the informational element is to be communicated to the MS using the common channel, USSD common channel processing module 906 may send, via transmission module 908, the informational element to a base station 108 to be transmitted to the MS using the common channel. Further, in an optional operational aspect, apparatus 902 may receive, via reception module 904, an acknowledgement 924 from the base station 108 indicating that the informational element was successfully received by the MS. The acknowledgement 924 may be processed by the USSD common channel processing module and sent to the USSD GW 117 via transmission module 924.

The apparatus may include additional modules that perform each of the steps of the algorithm in the aforementioned call flow and/or flow charts of FIGS. 3, 4, and 8. As such, each block in the aforementioned FIGS. 3, 4, and 8 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 10:
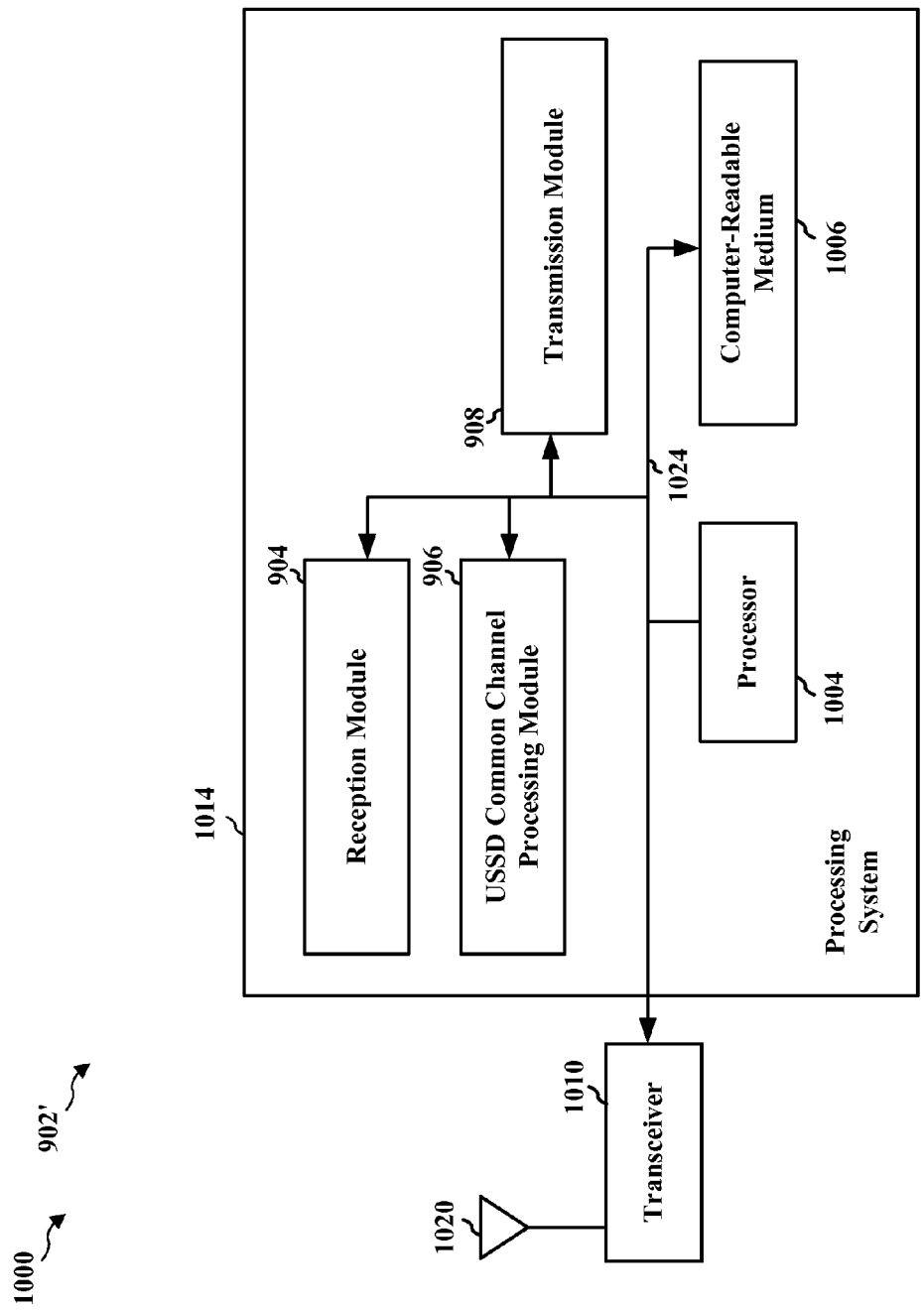
FIG. 10 is a diagram illustrating an example of a hardware implementation for an apparatus employing a processing system according to some embodiments.

FIG. 10 is a diagram 1000 illustrating an example of a hardware implementation for an apparatus 902' employing a processing system 1014. The processing system 1014 may be implemented with a bus architecture, represented generally by the bus 1024. The bus 1024 may include any number of interconnecting buses and bridges depending on the specific application of the processing system 1014 and the overall design constraints. The bus 1024 links together various circuits including one or more processors and/or hardware modules, represented by the processor 1004, the modules 904, 906, 908, and the computer-readable medium 1006. The bus 1024 may also link various other circuits such as timing sources, peripherals, voltage regulators, and power management circuits, which are well known in the art, and therefore, will not be described any further.

The processing system 1014 may be coupled to a transceiver 1010. The transceiver 1010 is coupled to one or more antennas 1020. The transceiver 1010 provides a means for communicating with various other apparatus over a transmission medium. The processing system 1014 includes a processor 1004 coupled to a computer-readable medium 1006. The processor 1004 is responsible for general processing, including the execution of software stored on the computer-readable medium 1006. The software, when executed by the processor 1004, causes the processing system 1014 to perform the various functions described supra for any particular apparatus. The computer-readable medium 1006 may also be used for storing data that is manipulated by the processor 1004 when executing software. The processing system further includes at least one of the modules 904, 906, and 908. The modules may be software modules running in the processor 1004, resident/stored in the computer readable medium 1006, one or more hardware modules coupled to the processor 1004, or some combination thereof. The processing system 1014 may be a component of the network entity 210 and may include the memory 276 and/or at least one of the TX processor 216, the RX processor 270, and the controller/processor 275.

In one configuration, the apparatus 902/902' for wireless communication includes means for receiving a USSD based message from a USSD GW that includes a service indicator prompting the MSC to communicate an informational element to a MS using a common channel, means for determining that the informational element is to be communicated to the MS using the common channel, and means for sending the informational element to a base station to be transmitted to the MS using the common channel. In an aspect, apparatus 902/902' may further provide means for receiving an acknowledgement from the base station indicating that the informational element was successfully received by the MS. In an aspect, the acknowledgement may include a USSD session release informational element to prompt the USSD GW to release a USSD session. In an aspect, apparatus 902/902' may further provide means for receiving a USSD session release message to prompt the USSD GW to release a USSD session, and means for sending the USSD session in response to receipt of the USSD session release message. The aforementioned means may be one or more of the aforementioned modules of the apparatus 902 and/or the processing system 1014 of the apparatus 902' configured to perform the functions recited by the aforementioned means. As described supra, the processing system 1014 may include the TX Processor 216, the RX Processor 270, and the controller/processor 275. As such, in one configuration, the aforementioned means may be the TX Processor 216, the RX Processor 270, and the controller/processor 275 configured to perform the functions recited by the aforementioned means.

Figure 11:
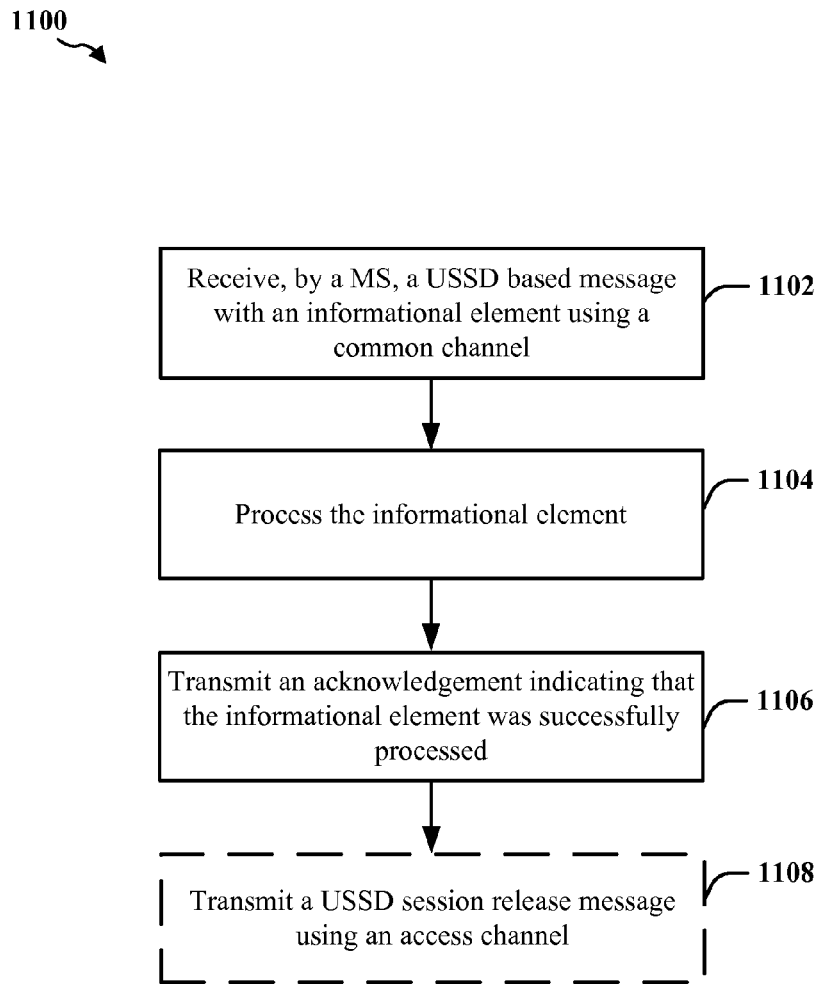
FIG. 11 is a flow chart diagram illustrating another example network initiated USSD message scheme on a common channel according to some embodiments.

FIG. 11 is a flow chart 1100 of a method of wireless communication. The method may be performed by a MS (e.g., UE 110).

At block 1102, the UE may receive a USSD based message with an informational element using a common channel. In an aspect, a reception module 1204 may be configured to receive the USSD based message. In an aspect, the USSD based message may be a USSD DBM, and the informational element may be a USSD Notify informational element.

At block 1104, the UE may process the informational element. In an aspect, USSD control channel processing module 1206 may be configured to process the informational element. For example, in an aspect, the USSD based message may include an M2M triggering message.

At block 1106, the UE may transmit an acknowledgement indicating that the informational element was successfully processed. In an aspect, the acknowledgement may be transmitted using transmission module 1208. In another aspect, the acknowledgement may include a USSD session release informational element to prompt a USSD GW to release a USSD session. In such an aspect, the USSD session release informational element may be generated by USSD session release module 1207.

In an optional aspect, at block 1108, the UE may transmit a USSD session release message using an access channel. In such an aspect, the USSD session release message may be generated using USSD session release module 1207 and transmitted using transmission module 1208.

Figure 12:
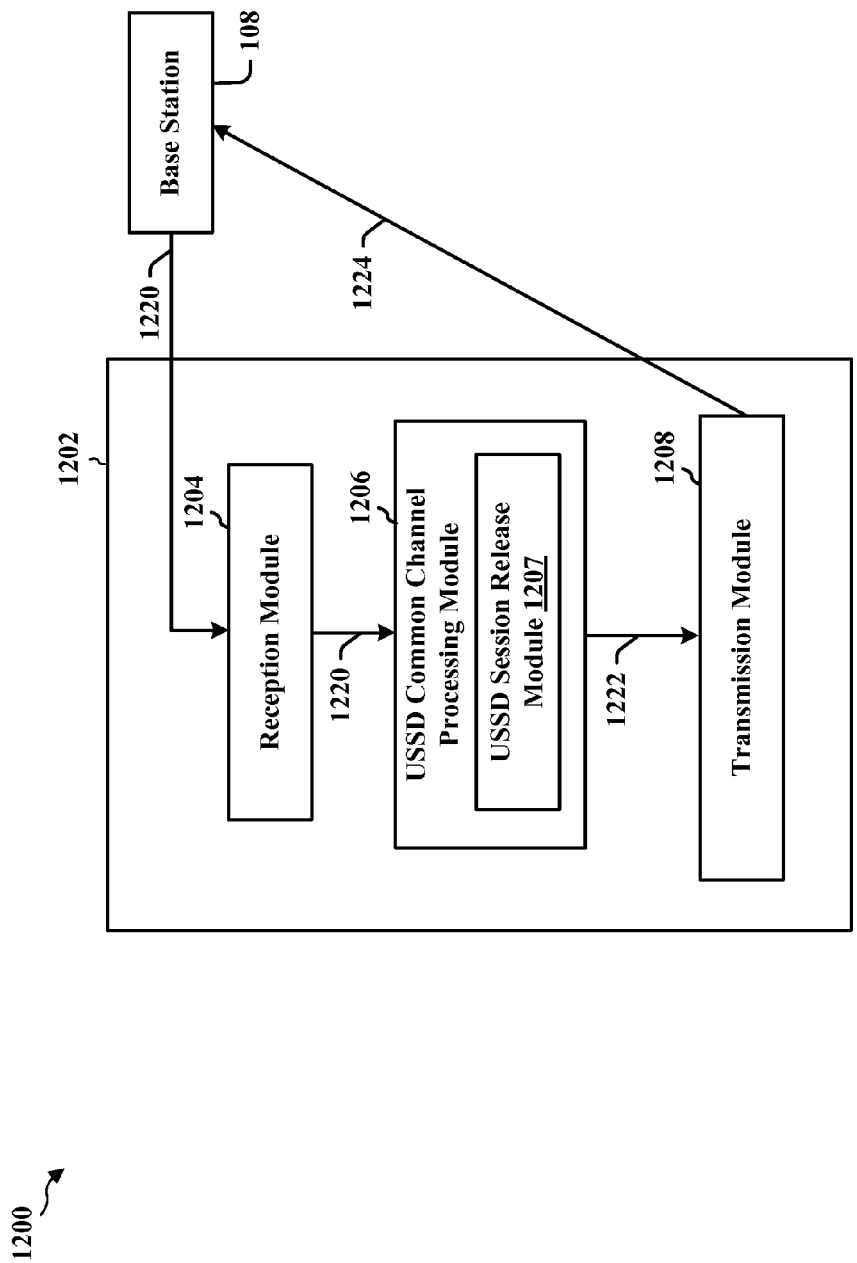
FIG. 12 is a conceptual data flow diagram illustrating the data flow between different modules/means/components according to some embodiments.

FIG. 12 is a conceptual data flow diagram 1200 illustrating the data flow between different modules/means/components in an exemplary apparatus 1202. The apparatus may be a UE (e.g., MS). As noted with reference to FIG. 11, the apparatus includes a reception module 1204, a USSD common channel processing module 1206, USSD session release module 1207, and a transmission module 1208.

In an operational aspect, apparatus 1202, via reception module 1204, may receive a USSD based message 1220 with an informational element using a common channel. Reception module 1204 may provide the USSD based message 1220 with the informational element to the USSD common channel processing module 1206 for processing. USSD common channel processing module 1206 may process the informational element associated with the USSD based message 1220. Further, USSD common channel processing module 1206 may determine the USSD session is complete and prompt USSD session release module 1207 to generate a USSD session release informational element 1222 to prompt a USSD GW to release a USSD session. The USSD session release informational element 122 may be included in an acknowledgement 1224 and transmitted, via transmission module 1208 to base station 108 for communication to the USSD GW.

The apparatus may include additional modules that perform each of the steps of the algorithm in the aforementioned call flow and/or flow charts of FIGS. 3, 4, and 11. As such, each block in the aforementioned FIGS. 3, 4, and 11 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 13:
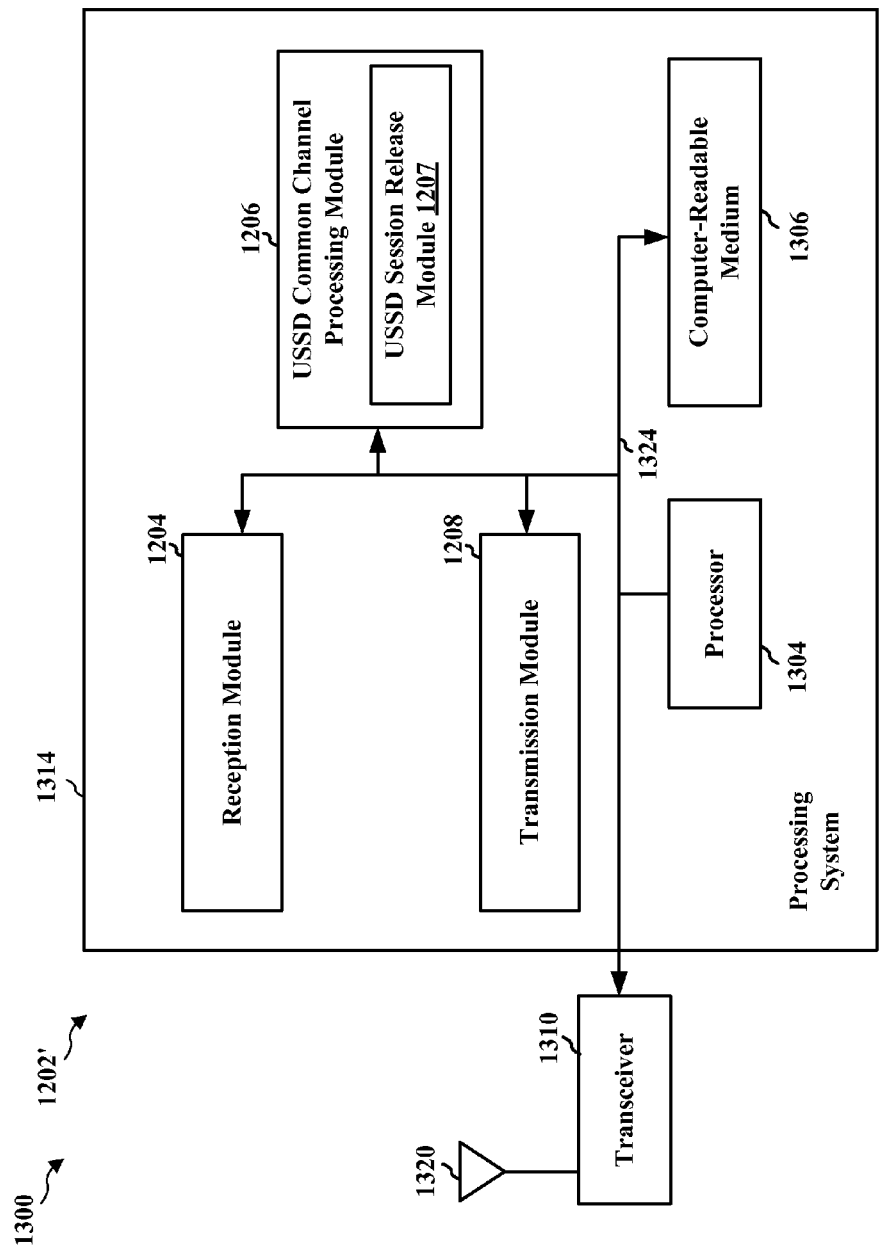
FIG. 13 is a diagram illustrating an example of a hardware implementation for an apparatus employing a processing system according to some embodiments.

FIG. 13 is a diagram 1300 illustrating an example of a hardware implementation for an apparatus 1202' employing a processing system 1314. The processing system 1314 may be implemented with a bus architecture, represented generally by the bus 1324. The bus 1324 may include any number of interconnecting buses and bridges depending on the specific application of the processing system 1314 and the overall design constraints. The bus 1324 links together various circuits including one or more processors and/or hardware modules, represented by the processor 1304, the modules 1204, 1206, 1207, 1208, and the computer-readable medium 1306. The bus 1324 may also link various other circuits such as timing sources, peripherals, voltage regulators, and power management circuits, which are well known in the art, and therefore, will not be described any further.

The processing system 1314 may be coupled to a transceiver 1310. The transceiver 1310 is coupled to one or more antennas 1320. The transceiver 1310 provides a means for communicating with various other apparatus over a transmission medium. The processing system 1314 includes a processor 1304 coupled to a computer-readable medium 1306. The processor 1304 is responsible for general processing, including the execution of software stored on the computer-readable medium 1306. The software, when executed by the processor 1304, causes the processing system 1314 to perform the various functions described supra for any particular apparatus. The computer-readable medium 1306 may also be used for storing data that is manipulated by the processor 1304 when executing software. The processing system further includes at least one of the modules 1204, 1206, 1207, and 1208. The modules may be software modules running in the processor 1304, resident/stored in the computer readable medium 1306, one or more hardware modules coupled to the processor 1304, or some combination thereof. The processing system 1314 may be a component of the UE 250 and may include the memory 260 and/or at least one of the TX processor 268, the RX processor 256, and the controller/processor 259.

In one configuration, the apparatus 1202/1202' for wireless communication includes means for receiving a USSD based message with an informational element using a common channel, means for processing the informational element, and means for transmitting an acknowledgement indicating that the informational element was successfully processed. In an aspect, apparatus 1202/1202' may further provide means for transmitting a USSD session release message using an access channel. The aforementioned means may be one or more of the aforementioned modules of the apparatus 1202 and/or the processing system 1314 of the apparatus 1202' configured to perform the functions recited by the aforementioned means. As described supra, the processing system 1314 may include the TX Processor 268, the RX Processor 256, and the controller/processor 259. As such, in one configuration, the aforementioned means may be the TX Processor 268, the RX Processor 256, and the controller/processor 259 configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of communications, comprising:
   determining whether an unstructured supplementary service data (USSD) based message is configured to be communicated by a network to a mobile station (MS) using a common channel;
   sending, by a USSD gateway (USSD GW) of the network, the USSD based message as part of a USSD session to a mobile switching center (MSC) of the network with a service indicator prompting the MSC to communicate the USSD based message to the MS using the common channel based on the determination that the USSD based message is configured to be communicated to the mobile station using the common channel; and
   sending, by the network, the USSD based message to the MS using a traffic channel based on a determination that the USSD based message is not configured to be communicated to the mobile station using the common channel.

2. The method of claim 1, further comprising receiving an acknowledgement from the MSC indicating that the USSD based message was successfully received by the MS over the common channel.

3. The method of claim 2, further comprising:
   receiving a USSD session release message to prompt the USSD GW to release the USSD session; and
   releasing the USSD session in response to receipt of the USSD session release message.

4. The method of claim 2, wherein the acknowledgement includes a USSD session release informational element to prompt the USSD GW to release the USSD session; and further comprising releasing the USSD session in response to receipt of the USSD session release informational element.

5. The method of claim 2, further comprising:
   initiating a timer upon sending the USSD based message; and
   stopping the timer upon receiving the acknowledgement.

6. The method of claim 1, further comprising:
   sending a request for an address for the MS to a home location register (HLR); and
   receiving a message including the address for the MS from the HLR.

7. The method of claim 1, wherein the USSD based message is a machine-to-machine (M2M) triggering message.

8. The method of claim 1, wherein the USSD based message is a USSD data burst message (DBM) and wherein the USSD based message is a USSD Notify informational element.

9. The method of claim 1, wherein the USSD based message is sent using an SMS Delivery Point-To-Point (SMDPP) format, and the service indicator is a code division multiple access (CDMA) M2M service indicator.

10. The method of claim 1, wherein the USSD based message is determined to be configured to be communicated using the common channel when one or both of a first size of the USSD based message and a second size of an informational element of the USSD based message is smaller than a threshold size.

11. The method of claim 1, further comprising:
    deciding whether the USSD based message is to be communicated using the common channel or an access channel; and
    wherein the determining further comprises determining to use the common channel based on the decision.

12. A method of communications, comprising:
    receiving, by a mobile switching center (MSC) and from an unstructured supplementary service data (USSD) gateway, a USSD based message that includes a service indicator;
    determining, based at least on the service indicator, whether the USSD based message is configured to be communicated to a mobile station (MS) using a common channel;
    sending the USSD based message to a base station to be transmitted to the MS using the common channel based on the determination that the USSD based message is configured to be communicated using the common channel; and
    sending the USSD based message to the base station to be transmitted to the MS using a traffic channel based on a determination that the USSD based message is not configured to be communicated using the common channel.

13. The method of claim 12, further comprising receiving an acknowledgement from the base station indicating that the USSD based message was successfully received by the MS over the common channel.

14. The method of claim 13, further comprising:
    receiving a USSD session release message to prompt the USSD GW to release a USSD session; and
    sending the USSD session release message to the USSD GW.

15. The method of claim 14, wherein the USSD session release message is received using an Application Data Delivery Service (ADDS) transfer message.

16. The method of claim 13, wherein the acknowledgement includes a USSD session release informational element to prompt the USSD GW to release a USSD session; and further comprising sending the USSD session release message to the USSD GW in response to receipt of the USSD session release informational element.

17. The method of claim 12, wherein the USSD based message is sent to the base station using an Application Data Delivery Service (ADDS) page message.

18. The method of claim 12, wherein the USSD based message is received from the USSD GW using a SMS Delivery Point-To-Point (SMDPP) format.

19. The method of claim 12, wherein the service indicator is a code division multiple access (CDMA) M2M service indicator.

20. The method of claim 12, wherein the USSD based message is a USSD data burst message (DBM), and wherein the USSD based message includes a USSD Notify informational element.

21. A method of communications, comprising:
receiving, by a mobile station (MS) from a network, an unstructured supplementary service data (USSD) based message using a common channel based on a determination by the network that the USSD based message is configured to be communicated using the common channel;
receiving, by the MS from the network, the USSD based message using a traffic channel based on a determination by the network that the USSD based message is not configured to be communicated using the common channel;
processing the USSD based message; and
transmitting an acknowledgement indicating that the USSD based message was successfully processed.

22. The method of claim 21, further comprising transmitting a USSD session release message using an access channel.

23. The method of claim 21, wherein the acknowledgement includes a USSD session release informational element to prompt a USSD GW to release a USSD session.

24. The method of claim 21, wherein the USSD based message is a USSD data burst message (DBM), and wherein the USSD based message includes a USSD Notify informational element.

25. An apparatus for communications, comprising:
means for determining whether an unstructured supplementary service data (USSD) based message is configured to be communicated by a network to a mobile station (MS) using a common channel;
means for sending, by a USSD gateway (USSD GW) of the network, the USSD based message as part of a USSD session to a mobile switching center (MSC) of the network with a service indicator prompting the MSC to communicate of the USSD based message to the MS using the common channel based on the determination that the USSD based message is configured to be communicated to the mobile station using the common channel; and
means for sending, by the network, the USSD based message to the MS using a traffic channel based on a determination that the USSD based message is not configured to be communicated to the mobile station using the common channel.

26. An apparatus for communications, comprising:
means for receiving, by a mobile switching center (MSC) from an unstructured supplementary service data (USSD) gateway, a USSD based message that includes a service indicator;
means for determining, based at least on the service indicator, whether the USSD based message is configured to be communicated to a mobile station (MS) using a common channel;
means for sending the USSD based message to a base station to be transmitted to the MS using the common channel based on the determination that the USSD based message is configured to be communicated using the common channel; and
means for sending the USSD based message to the base station to be transmitted to the MS using a traffic channel based on a determination that the USSD based message is not configured to be communicated using the common channel.

27. An apparatus for communications, comprising:
means for receiving, by a mobile station (MS) and from a network, an unstructured supplementary service data (USSD) based message using a common channel based on a determination by the network that the USSD based message is configured to be communicated using the common channel;
means for receiving, by the MS and from the network, the USSD based message using a traffic channel based on a determination by the network that the USSD based message is not configured to be communicated using the common channel;
means for processing the USSD based message; and
means for transmitting an acknowledgement indicating that the USSD based message was successfully processed.

28. A non-transitory computer-readable medium storing computer-executable code, comprising:
code for determining whether an unstructured supplementary service data (USSD) based message is configured to be communicated by a network to a mobile station (MS) using a common channel;
code for sending, by a USSD gateway (USSD GW) of the network, the USSD based message as part of a USSD session to a mobile switching center (MSC) of the network with a service indicator prompting the MSC to communicate the USSD based message to the MS using the common channel based on the determination that the USSD based message is configured to be communicated to the mobile station using the common channel; and
code for sending, by the network, the USSD based message to the MS using a transport channel based on a determination that the USSD based message is not configured to be communicated to the mobile station using the common channel.

29. A non-transitory computer-readable medium storing computer-executable code, comprising:
code for receiving, by a mobile switching center (MSC) and from an unstructured supplementary service data (USSD) gateway, a USSD based message that includes a service indicator;
code for determining, based at least on the service indicator, whether the USSD based message is configured to be communicated to a mobile station (MS) using a common channel;
code for sending the USSD based message to a base station to be transmitted to the MS using the common channel based on the determination that the USSD based message is configured to be communicated using the common channel; and
code for sending the USSD based message to the base station to be transmitted to the MS using a traffic channel based on a determination that the USSD based message is not configured to be communicated using the common channel.

30. A non-transitory computer-readable medium storing computer-executable code, comprising:
code for receiving, by a mobile station (MS) and from a network, an unstructured supplementary service data (USSD) based message using a common channel based on a determination by the network that the USSD based message is configured to be communicated using the common channel;
code for receiving, by the MS and from the network, the USSD based message using a traffic channel based on a determination by the network that the USSD based message is not configured to be communicated using the common channel;
code for processing the USSD based message; and
code for transmitting an acknowledgement indicating that the USSD based message was successfully processed.

31. An apparatus for communications, comprising:
a processing system configured to:
determining whether an unstructured supplementary service data (USSD) based message is configured to be communicated by a network to a mobile station (MS) using a common channel;
sending, by a USSD gateway (USSD GW) of the network, the USSD based message as part of a USSD session to a mobile switching center (MSC) of the network with a service indicator prompting the MSC to communicate the USSD based message to the MS using the common channel based on the determination that the USSD based message is configured to be communicated to the mobile station using the common channel; and
sending, by the network, the USSD based message to the MS using a transport channel based on a determination that the USSD based message is not configured to be communicated to the mobile station using the common channel.

32. The apparatus of claim 31, wherein the processing system is further configured to receive an acknowledgement from the MSC indicating that the USSD based message was successfully received by the MS over the common channel.

33. The apparatus of claim 32, wherein the processing system is further configured to:
receive a USSD session release message to prompt the USSD GW to release the USSD session; and
release the USSD session in response the receipt of the USSD session release message.

34. The apparatus of claim 32, wherein the acknowledgement includes a USSD session release informational element to prompt the USSD GW to release the USSD session, wherein the processing system is further configured to release the USSD session in response to receipt of the USSD session release informational element.

35. The apparatus of claim 32, wherein the processing system is further configured to:
initiate a timer upon sending the USSD based message; and
stop the timer upon receiving the acknowledgement.

36. The apparatus of claim 31, wherein the processing system is further configured to:
send a request for an address for the MS to a home location register (HLR); and
receive a message including the address for the MS from the HLR.

37. The apparatus of claim 31, wherein the USSD based message is a machine-to-machine (M2M) triggering message.

38. The apparatus of claim 31, wherein the USSD based message is a USSD data burst message (DBM) and wherein the USSD based message includes a USSD Notify informational element.

39. The apparatus of claim 31, wherein the USSD based message is sent using a SMS Delivery Point-To-Point (SM-DPP) format, and the service indicator is a code division multiple access (CDMA) M2M service indicator.

40. The apparatus of claim 31, wherein the USSD based message is determined to be configured to be communicated using the common channel when one or both of a first size of the USSD based message and a second size of an informational element of the USSD based message is smaller than a threshold size.

41. The apparatus of claim 31, wherein the processing system is further configured to:
decide whether the USSD based message is to be communicated using the common channel or an access channel; and
determine to use the common channel based on the decision.

42. An apparatus for communications, comprising:
a processing system configured to:
receive, by a mobile switching center (MSC) from an unstructured supplementary service data (USSD) gateway, a USSD based message that includes a service indicator;
determine, based at least on the service indicator, whether the USSD based message is configured to be communicated to a mobile station (MS) using a common channel;
send the USSD based message to a base station to be transmitted to the MS using the common channel based on the determination that the USSD based message is configured to be communicated using the common channel; and
send the USSD based message to the base station to be transmitted to the MS using a traffic channel based on a determination that the USSD based message is not configured to be communicated using the common channel.

43. The apparatus of claim 42, wherein the processing system is further configured to receive an acknowledgement from the base station indicating that the USSD based message was successfully received by the MS over the common channel.

44. The apparatus of claim 43, wherein the processing system is further configured to:
receive a USSD session release message to prompt the USSD GW to release a USSD session; and
send the USSD release message to the USSD GW.

45. The apparatus of claim 44, wherein the USSD session release message is received using an Application Data Delivery Service (ADDS) transfer message.

46. The apparatus of claim 43, wherein the acknowledgement includes a USSD session release informational element to prompt the USSD GW to release a USSD session; and further comprising sending the USSD session release message to the USSD GW in response to receipt of the USSD session release informational element.

47. The apparatus of claim 42, wherein the informational element is sent to the base station using an Application Data Delivery Service (ADDS) page message.

48. The apparatus of claim 42, wherein the USSD based message is received from the USSD GW using a SMS Delivery Point-To-Point (SMDPP) format.

49. The apparatus of claim 42, wherein the service indicator is a code division multiple access (CDMA) M2M service indicator.

50. The apparatus of claim 42, wherein the USSD based message is a USSD data burst message (DBM), and wherein the USSD based message includes a USSD Notify informational element.

51. An apparatus for communications, comprising:
a processing system configured to:
receive, by a mobile station (MS) and from a network, an unstructured supplementary service data (USSD) based message using a common channel based on a determination by the network that the USSD based message is configured to be communicated using the common channel;
receive, by the MS and from the network, the USSD based message using a traffic channel based on a determination by the network that the USSD based message is not configured to be communicated using the common channel;
process the USSD based message; and
transmit an acknowledgement indicating that the USSD based message was successfully processed.

52. The apparatus of claim 51, wherein the processing system is further configured to transmit a USSD session release message using an access channel.

53. The apparatus of claim 51, wherein the acknowledgement includes a USSD session release informational element to prompt a USSD GW to release a USSD session.

54. The apparatus of claim 51, wherein the USSD based message is a USSD data burst message (DBM), and wherein the USSD based message includes a USSD Notify informational element.

* * * * *